US005548010A

United States Patent [19]

Franer

[11] Patent Number: 5,548,010

[45] Date of Patent: Aug. 20, 1996

[54] COLOR DISSIPATABLE PAINT

[76] Inventor: Victor R. Franer, 218 W. County Rd. B2, Roseville, Minn. 55113

[21] Appl. No.: 175,264

[22] Filed: Dec. 29, 1993

[51] Int. Cl.[6] .............................. C08K 5/09; C08K 5/07

[52] U.S. Cl. .............................. 524/198; 524/215; 524/313; 524/284; 524/80

[58] Field of Search .............................. 524/198, 215, 524/313, 284, 80

[56] References Cited

U.S. PATENT DOCUMENTS 5,326,388 7/1994 Miller et al. .............................. 106/22 B

OTHER PUBLICATIONS

BASF Technical Informatin Bulletin, entitled "Color Basonyl® dyes", Aug. 1987, p. 5, TI/P2808.

BASF Corp. Technical Information Bulletin, entitled "Color Flexo Dyes", Dec. 1986, TI/P 2636, pp. 2, 6–9.

Warner–Jenkinson Company, Product Bulletin entitled "Certified Food Colors", Dated Sep. 1990, pp. 7, 9, 26, 29.

Warner Jenkinson Product Bulletin entitled "Cerifified Food Colors", Jul. 1993, pp. 8–9, 33, 36, 37.

Warner—Jenkinson Product Bulletin entitled "All About Lakd Pigments", Oct. 1992, pp. 5, 9.

BASF Corp. Technical Bulletin BCS 1110 Aug., 1990, entitled "Color Basonyl® NB Dyes", p. 4.

*Primary Examiner*—Paul R. Michl

*Assistant Examiner*—John J. Guarriello

*Attorney, Agent, or Firm*—Janet Peyton Schafer

[57] ABSTRACT

A color additive, when added to paints, whether water-based or oil-based, varnishes, sealers, lacquers, and other protective or decorative compositions, and to additives therefor, that when applied on a surface provides for a color that dissipates within a reasonable time frame, generally from hours to a few days leaving the paint the original color. The color additives temporarily impart color to paint, the color dissipating over a short period of time substantially to the color of the original composition prior to the addition of the colorant thereto, whether they are water white, tinted or pigmented. A method of temporarily imparting a fugitive color to paint.

14 Claims, 1 Drawing Sheet

DISSIPATION RATE OF BASONYL GREEN DYE IN WATER-BASED LATEX PAINT

TIME FOR DYE TO DISSIPATE, HRS.

PARTS OF DYE / 100 PARTS OF PAINT

X = TIME DISSIPATION OF DYE

O = "POT-LIFE" OF DYE COLOR IN PAINT

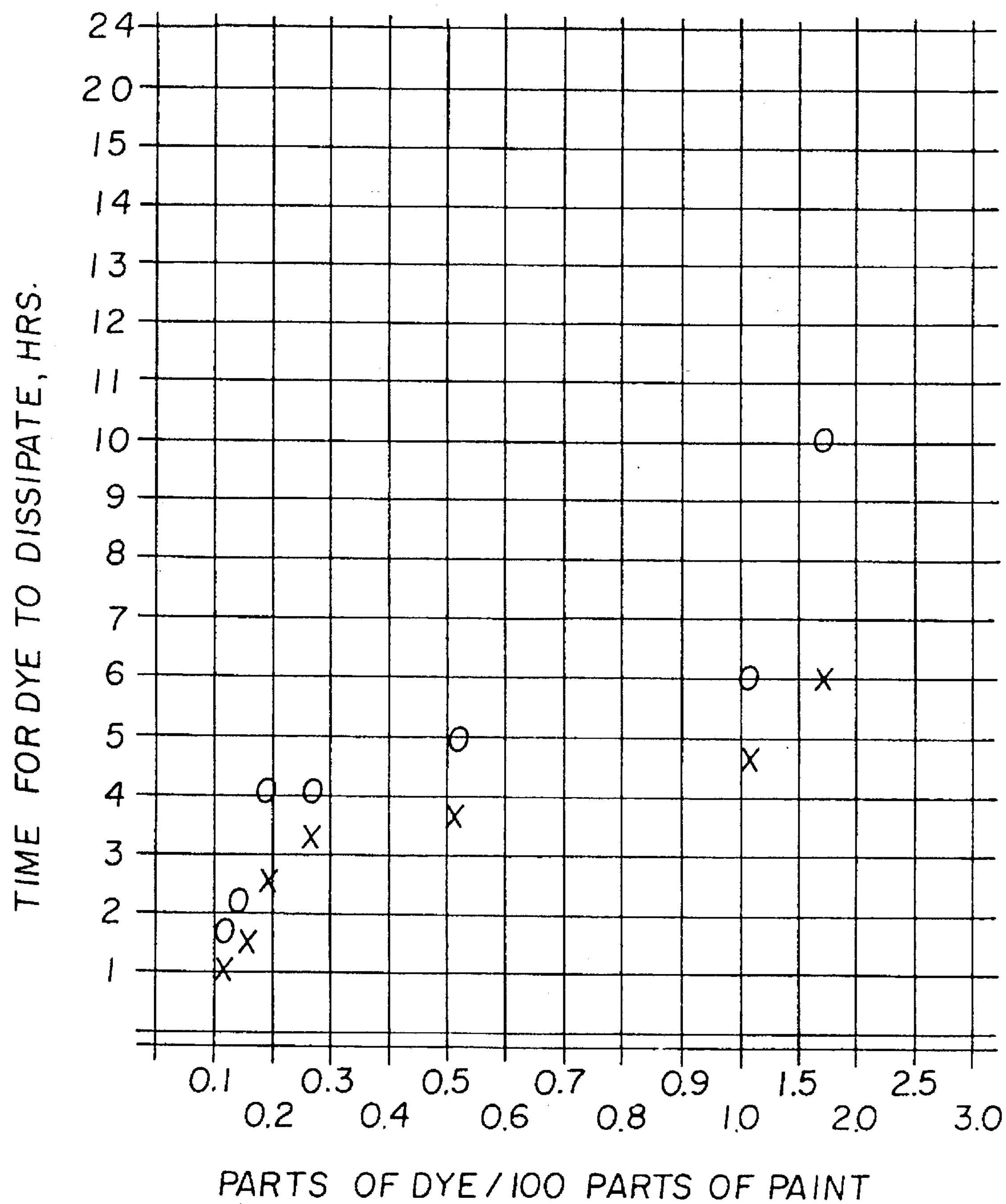
DISSIPATION RATE OF BASONYL GREEN DYE IN WATER-BASED LATEX PAINT
TIME FOR DYE TO DISSIPATE, HRS.
24
20
15
14
13
12
11
10
9
8
7
6
5
4
3
2
1
0.1
0.2
0.3
0.4
0.5
0.6
0.7
0.8
0.9
1.0
1.5
2.0
2.5
3.0
PARTS OF DYE/100 PARTS OF PAINT
X = TIME DISSIPATION OF DYE
O = "POT-LIFE" OF DYE COLOR IN PAINT

COLOR DISSIPATABLE PAINT

BACKGROUND

This invention relates to paints, whether water-based or oil-based, varnishes, sealers, lacquers, and other protective coatings or decorative compositions, and to additives therefor. (For convenience, the word "paint" will be frequently used herein as a generic term for all such compositions, whether they are water white, tinted or pigmented.) The invention is particularly concerned with additives that temporarily impart color to paint, the color dissipating over a short period of time. A further aspect of the invention is a method of temporarily imparting a fugitive color to paint.

Paints have been formulated to retain their color. It has been an aim of manufacturers to achieve more permanency and fastness of color to resist fading for as long a possible. Current paint additives are directed to features such as extending the shelf-life of paint, increasing the color fastness of paint, reducing the tendency of paint to fade in sunlight, among others.

In the past, applying paint to like-colored surfaces has been a problem because the user has difficulty observing what has and what has not been painted; e.g., painting a white ceiling white. Current solutions include re-painting all or part of the surface, which can result in an uneven surface, and is time consuming; or changing the color of the surface being painted, which may not be as aesthetically pleasing to the consumer.

For the foregoing reasons, there is a need for a paint additive that aids the user to differentiate what has been recently painted from an old painted surface when repainting with like-colored paint or similar compositions.

SUMMARY

The present invention is directed to a chemical composition that satisfies the need for a paint additive that aids the user to differentiate what has been recently painted from an old painted surface when repainting with like-colored paint.

The chemical composition comprises a color-dissipatable paint additive that, because it has a light unstable dye therein, when mixed with paint, provides a second color that dissipates within a reasonable time frame, generally from hours to a few days. This paint additive comprises a system for the temporary addition of a dye to paint or other similar compositions. After application of the combination paint-plus-dye on the surface to be painted, the dye is dissipated by oxidation, reduction, exposure to light or a combination thereof.

An embodiment of this invention is a color-dissipatable paint where the dissipatable color is selected from a group of dyes including basonyl green, basonyl blue, pylam blue, triaylmethanes; flexo yellow, diarylmethane; FD&C #2 indigotene; FD&C#2 lake; FD&C#1, FD&C#3 green, triphenylmethanes; FD&C#1 lake; FD&C#5 yellow, pyrazoine; erythrosine lake; and FD&C#5 yellow lake.

A color-dissipatable paint where the paint is selected from a group including oil-based paint, water-based paint, acrylic paint (both water-based and oil based), urethane, chlorinated rubber (both water-based and oil-based), vinyl, polyamide, raw linseed oil, varnish, and an oil-modified alkyd resin such as Duramac® 2452 to which is added a light-unstable dye.

A color-dissipatable paint consisting of a dye carrier selected to increase the ease of measuring the dye for addition to the paint-like composition, to which is added a light-unstable dye. The dye carrier is further selected to increase miscibility of the dye when mixed into the paint-like composition, the dye carrier selected from a group including water, glycerin, propylene glycol, soybean oil, vinegar, modified starch, corn syrup, sodium benzoate and hydroxyl propyl methocellulose, such as Methocel® J-12MS.

The method of making a decorative or protective paint having a first color but initially displaying a color that is a blend of the first color and a second color imparted by a light-unstable dye, the second color dissipating over a relatively short period of time when exposed to one or more dissipation promoting conditions of light, oxidation, or reduction, depending on the chemical composition of the dye, to reveal the first color, comprising the steps of obtaining a composition having a first color and mixing uniformly thereinto an amount of a light-unstable dye having a second color sufficient to obtain the blended color.

The method of applying a decorative or protective coating having a first color over a substrate also having the first color while still being able to easily determine where said coating has been applied, comprising applying the paint composition previously described to the substrate and causing the second color of the light-unstable dye to dissipate.

An important advantage of an embodiment of the present invention is that a temporary dye can be added to paint, or like composition, that enables the user to observe what has been recently painted. This enables the user to observe where the user has just been painting when painting like-colored paint onto a previously painted surface.

A further advantage is that the paint additive has no ill effects on the paint-like composition itself. The paint, or other similar composition, can be used in its normal method even if the dye has dissipated prior to use. Additionally, the paint, or other composition, can be "re-dyed" without negatively affecting the paint.

These and other features, aspects, and advantages of the present invention will become better understood with reference to the following description and appended claims.

BRIEF DESCRIPTION OF THE DRAWING

Understanding of the invention will be enhanced by referring to the accompanying drawing, FIG. 1 which summarizes the results of various concentrations of a sample dye that have been added to a set amount of a representative paint. The sample dye is basonyl green, listed at Example B following, and the representative paint is a water-based latex paint, the composition of which is listed in Example A following.

DETAILED DESCRIPTION OF THE PREFERRED EMBODIMENTS

Understanding of the invention will be further enhanced by referring to the following illustrative but nonlimiting examples.

fit is well known that some dyes have poor light stability characteristics. Two typical dyes of this category are, FD&C#2 blue (indigotene), and Basonyl® green NB-832 (triarylmethane). I have found that when having introduced an appropriate dye, of the proper amount to achieve the desired color tint in a suitable formulated paint, varnish or the like, surprisingly, it is possible to reverse the color through dye dissipation. This is achieved by oxidization, reduction, exposure to light, or a combination thereof. In this manner I can produce a paint additive that temporarily changes the color of the paint, varnish, etc. This paint additive produces a color that is reversible over a reasonable period of time.

Example A illustrates a representative vinyl acrylic latex paint composition. Other useful latex paints used successfully include styrene-acrylic co-polymers, acrylic latex and co-polymers, polyvinyl chloride resins, polyvinyl acetates, chlorinated rubber and combinations thereof.

EXAMPLE A. REPRESENTATIVE WATER-BASED LATEX PAINT

| Paint/Primer Composition | Parts/100 (as measured by weight) | Range |
|---|---|---|
| De-foamer (collodial-silicate aliphatic petroleum | 1.10 | 0.35–1.5 |
| Methocel ™ J-12MS (hydroxyl propyl methocellulose) | .43 | 0.05–1.0 |
| TKPP (tetra potassium pyrophosphate) | .08 | 0.0–1.5 |
| DAXAD ™ - 30 (sodium polymethacrylate) | .44 | 0.30–0.6 |
| RR-551 (vegetable phosphatides) | .22 | 0.0–0.5 |
| CO-630 Solvent ™ (oxygenated hydrocarbon) | .22 | 0.0–0.5 |
| propylene glycol (methyl ethylene glycol) | 6.28 | 0.0–10.0 |
| Texanol ™ solvent (ethyl butyl ether) | 3.62 | 0.5–7.0 |
| AMP - 95 (amine/alcohol hydrocarbon) | .06 | 0.03–2.5 |
| BUSAN ™ - 1024 (methyl -3,5,7, triaza -1 azoniatricyclodecane chloride) | .22 | 0.05–2.5 |
| TiO2-R-900 (titanium dioxide) | 2.63 | 1.5–7.5 |
| Duramite 0325 (calcium carbonate) | .97 | 0.0–7.0 |
| Attagel-50 (magnesium aluminum silicate) | .46 | 0.0–10.0 |
| Latex-3083 ™ (vinyl acrylic co-polymer) | 16.43 | 12.0–55.0 |
| Water | 53.01 | 25.0–60.0 |
| Satintone ® -W (calcinated aluminum silicate) | 8.0 | 0.0–10.0 |
| Atomite ™ (calcium carbonate) | 5.83 | 0.0–7.0 |
| | 100.00 | |

Dyes which have been found most useful are those known to have relatively poor light stability. Dyes may vary as to light sensitivity; however, the light-fastness does not depend solely on the light itself. It is also governed, to a large extent, by the concentration of the dye, the thickness of the coating, the nature of the binder and other constituents, plus the special composition of the paint and the dye, the incident light and other factors; namely, reaction of the dye to oxidizing agents, reducing agents, drying time, etc. Consideration is therefore required with the embodiment to equate the constituents and the amounts best suited to the type of dye and characteristics desired in the dissipating color application thereof; i.e. whether it is desired that the dye color dissipates in minutes, hours or days. Also relevant to the selection of the dye is not only the reaction of the dye to other constituents with regard to stability, but pH factor, solubility, length of pot-life, storage expectations and performance of paint during application. The following is a typical light-unstable dye.

EXAMPLE B. DYE/COLORANT COMPOSITION

Basonyl® Green NB—832 Liquid™, Manufactured by BASF Corp., 36 Riverside Ave Rensselaer, N.Y.

| Composition | Amount to 100 parts paint (as measured by weight) | Range |
|---|---|---|
| 6.0 parts Basonyl ® Green NB-832 (liquid dye) | 0.0095 | 0.0019–0.0285 |
| 94.0 parts water (distilled) | 0.1488 | 0.0298–0.4465 |
| 100.0 | 0.1583 | |

In actual use conditions, the paint compositions and the added dye are uniformly mixed and are coated on a specially prepared white paperboard substrate, such as that made by Leneta Co. A metal-bar coater, such as that manufactured by P. G. & T. Co., is used to apply the paint to maintain a uniform coating of 6 millimeters. The coated paperboard is subjected to a constant fluorescent lighting from a bank of four 60 watt fluorescent bulbs positioned approximately five feet from the coated paperboard substrates. The light reading, as measured by a universal exposure meter, specifically a "Weston Master" model 715, manufactured by Weston Electrical Instrument Corporation, Newark, M.J., is 6.5 units. The ambient temperature is 74 degrees F. The rate of color dissipation describes when the dye is no longer observable on the paint cards when compared to a control. The control consists of a paint card of the type listed above with the representative water-based paint without the addition of the dye. The "pot life" indicated is the length of time the color remains observable in the "pot" after being mixed with the paint. Table I summarizes the results shown graphically in the Figure.

TABLE I

DISSIPATION RATE OF BASONYL ® GREEN DYE IN WATER-BASED LATEX PAINT

| | Parts dye/100 parts paint (as measured by weight) | Dissipates | "Pot Life" |
|---|---|---|---|
| Example I | 1.583 | 6 hrs. | 10 hrs. |
| Example II | 1.055 | 4.5 hrs. | 6 hrs. |
| Example III | 0.5277 | 3.5 hrs. | 5 hrs. |
| Example IV | 0.2638 | 3.25 hrs. | 4 hrs. |
| Example V | 0.1759 | 2.5 hrs. | 4 hrs. |
| Example VI | 0.1319 | 1.5 hrs. | 2.25 hrs. |
| Example VII | 0.1055 | 1.0 hrs. | 1.75 hrs. |

In one embodiment of this invention, to 100 parts of the composition, or paint, described at Example A above, add 0.1583 parts of Example B to produce the most acceptable results.

The following Table II indicates actual use results of various dyes used in the representative water-based latex paint described at Example A above and in which all tests were wet coatings of 6 millimeter in thickness and used glycerin as the dye carrier. All other environmental factors remain the same as described above.

TABLE II

DISSIPATION RATE OF SELECTED DYES IN WATER-BASED LATEX PAINT

| | Parts dye/100 parts paint (as measured by weight) | Dissipates | "Pot Life" |
|---|---|---|---|
| Basonyl ® green (liquid dye) | 0.0015384 | 4 hrs. | 7 hrs. |
| FD&C #2 indigotene | 0.0015384 | 0.75 hrs. | 6 hrs. |
| FD&C #3 erythrosine | 0.0015384 | 36 hrs. | >3 months |
| Basonyl ® green (liquid dye) | 0.0030769 | 5.25 hrs. | 8 hrs. |
| FD&C #2 indigotene | 0.0030769 | 2 hrs. | 96 hrs. |
| FD&C #3 erythrosine | 0.0030769 | 42 hrs. | >3 months |

In these examples, the amount of observable color is directly related to the total amount of the paint-dye combination. The particular desired results can be accomplished by use of a dye that dissipates in an optimum amount of time in the preferred paint or other composition. The particular end result can be achieved by choosing a dye with the desired characteristics that works in the preferred paint or other composition.

Some dyes in a given formulation will require as many as seven days to dissipate while others dissipate within 15 minutes depending upon the combination of dye, paint embodiments, amount of light, oxidizers, reducers, and the like. This factor must be taken into consideration when selecting a particular dye to work in a particular composition.

Other dyes that are useful in this invention, are: Basonyl® Blue—640, (triarylmethane); "Flexo Yellow" 110 LD, (diarylmethane); both available from BASF Corp., 36 Riverside Ave., Rensselaer, N.Y.; FD&C #2 Blue Powder (indigotene); FD&C #2 AL. Lake, both supplied by Hilton-Davis Co., 2235 Langdon Farm Road, Cincinnati, Ohio; an unspecified blue power, available from Formulabs, P.O. Box 1116 Piqua, Ohio; FD&C#2 (indigotene) supplied by Triton Colors, Inc., 16 Leliarts Lane, Elmwood Park, N.J.; Pylam® Blue LX 5595, (triarylmethane), available from Pylam Products Co., Inc. 1001 Stewart Ave., Garden City, N.Y.; FD&C Blue #1 Powder, (triphenylmethane); FD&C #1 A1.Lake; FD&C Yellow #5 (pyrozoine); FD&C Green #3, (triphenylmethane); Erythrosine Lake #9301; and FD&C Yellow Lake #5; commercially available from Warner-Jenkinson Co., Inc., a subsidiary of Universal Foods Corp., 2526 Baldwin St., P.O. Box 14538, St. Louis, Mo.

Some dyes, e.g. FD&C #2 AL. lake, require the presence of a stronger oxidizing agent or a reducing agent to interact with the dye to accomplish the desired dissipation. One such oxidizing agent is hydrogen peroxide, in the amount ranging as follows:

EXAMPLE C. OXIDIZING AGENTS/REDUCING AGENTS

| | | Range |
|---|---|---|
| 100.0 | parts Example A. paint, as listed above | |
| 1.38 | parts hydrogen peroxide 3% (as measured by weight) | .85–2.6 |

Other examples of useful oxidizers and/or reducers are: calcium hydroxide, sodium hydroxide, chlorine, hypochlorite, sulfur dioxide, oxalic acid, ascorbic acid, borates, barium metaborate monohydrate including Busan-24, AMP -95, TKPP, and ethyl butyl ether. The following Table III illustrates results obtained with some of these oxidizing and reducing agents when mixed with the representative water-based latex paint of Example A.

TABLE III

RESULTS OF VARIOUS OXIDIZING/REDUCING AGENTS IN LATEX PAINT

| Components | Parts dye/100 parts paint (as measured by weight) | Dissipates | "Pot Life" |
|---|---|---|---|
| FD&C #2 blue | 0.00606 | 12 hrs. | 3 days |
| Busan ™ | 10.0 | | |
| FD&C #2 blue | 0.00606 | 3.5 hrs. | 2 days |
| AMP-95 | 10.0 | | |
| FD&C #2 blue | 0.0101 | 1 hr. | 1.25 hrs. |
| hydrogen peroxide | 13.3 | | |
| FD&C #2 blue | 0.00606 | 2.5 hrs. | 6 hrs. |
| AMP-95 | 4.4 | | |
| BUSAN | 4.4 | | |
| TKPP | 1.2 | | |
| Water | 1.2 | | |

Dye Carriers

Dye carriers are frequently used because they increase the miscibility of the dye into the composition and also because they ease the measuring of tiny amounts of the dye for addition to the composition. Typically, the dye is dissolved in the carrier prior to the addition to the paint or other composition. Dye carriers can be one of many constituents or combination thereof such as: water, glycerin, propylene glycol, soybean oil, vinegar, modified starch, corn syrup, sodium benzoate, Methocel™ J-12 MS. Use of a dye carrier enables the dye to be more easily dispensed into the desired paint or other composition, enabling use of, e.g., a machine for color dispensing, such as Tintmaster®, made by Miller Manufacturing Co., a Division of Fluid Management, Addison, Ill. Following is detailed the composition of a representative dye in a representative carrier.

EXAMPLE D. DYE CARRIER PLUS DYE

| Composition (as measured by weight) | | Range |
|---|---|---|
| 2.65 | parts Methocel ™ J-12 MS | 2.00–3.00 |
| .70 | part FD&C Blue #2 (Indigotene) | .50–.90 |
| 5.48 | parts propylene glycol | 3.50–7.50 |
| 90.20 | parts water (distilled) | 8.80–92.20 |
| .53 | part L-464 De-foamer | .40–.75 |

-continued

| Composition (as measured by weight) | Range |
|---|---|
| .44 part ammonium hydroxide 27% | .30–.50 |
| 100.00 | |

Dye carriers aid in the dispensing of the dye to the paint or other composition. One method of dispensing, or providing a single application of the dye into the paint, is use of individually sealed packets containing the exact amounts of required dye solution to facilitate different quantities of paint or other composition. One embodiment of such a dispenser is a pouch constructed of opaque materials. One form of packaging is supplied by Lin-Pak, 110 Sanderson Ave., Swanton, Ohio, a division of Lincoln Research, Inc., which is comprised of #25 bleached craft paper, #7 polyethylene, 0.3 millimeters (0.0003) aluminum foil and 1 millimeter (0.001) Surlyn®, an inomer resin manufactured by Dupont, although any opaque packaging could be used. A pouch can be used to isolate the dye from the paint until such time as the user chooses to add the dye to the paint. The dye can be mixed with the paint at time of manufacture, at time of purchase of the paint, or be dispensed into the paint at time of use. Because the paint can be dyed, without negatively affecting the paint, the user can use the paint even after the color dissipates in the mixed dye and paint composition, of course without the advantage of the present embodiment. Additionally, because the dye doesn't negatively affect the paint, the paint can be re-dyed.

Other methods of dispensing the dye are envisioned, such as a pouch affixed to the underside of the paint can lid; a container sold separately from the paint; a container sold in conjunction with the paint; or direct addition of the dye to the paint at the time of manufacture. Many dispensers could be utilized so long as the dispensers provide an opaque environment for the dye prior to the dye being mixed with the paint because of the light sensitivity of most these dyes.

Other Dye-Able Compositions

As previously stated, the same resulting characteristics of a dissipatable color in paint can also be achieved in an oil prominent embodiment. The following, describes the components of a typical oil-based paint.

EXAMPLE E. REPRESENTATIVE OIL BASED ENAMEL WHITE PAINT

| Paint Composition | Parts/100 (as measured by weight) | Range |
|---|---|---|
| Alkyd 5070/2632 (polyester, modified) | 29.70 | 20.0–35.0 |
| calcium drier 6% (calcium soap of mixed fatty acids) | 0.16 | 0.12–0.20 |
| mineral spirits (aliphatic naphtha) | 11.69 | 7.0–15.00 |
| anti-float liquid (1,2,4 trimethylbenzenexylene) | .15 | 0.10–0.30 |
| TiO2-R-900 (titanium dioxide) | 16.22 | 16.00–24.00 |
| Sanitone ® W (calcium aluminum silicate) | 14.19 | 6.00–20.00 |
| Atomite ™ /Gamaco ™ 11/0-4 (calcium carbonate) | 8.11 | 5.00–15.00 |
| Celite ™ 499/Dacalite ™ 295 (calcinated diatomaceous earth) | 6.08 | 4.00–10.00 |
| anti-skinning agent (methyl ethyl ketoximine) | 0.15 | 0.04–0.30 |
| cobalt drier 12% (carboxylate, metal salt) | 0.16 | 0.10–0.24 |
| zirconium drier 18% (zirconium alkanoate) | 0.40 | 0.20–0.70 |
| water | 0.84 | 0.50–1.00 |
| Troysol ™ 98C (1-butyric alcohol amphoteric wetting agent) | 0.15 | 0.06–0.20 |
| Dislon ™ 6900 -20X (synthetic polyamide wax) | 1.70 | 0.90–2.40 |
| Busan ™ 1030 aromatic hydrocarbon methane (2-(tricyanomethyl-thio)benzothiazole) | .10 | 0.05–0.15 |
| oil urethane 57-5845 (oil modified polyurethane) | 10.20 | 7.00–14.00 |
| | 100.00 | |

TABLE IV

RESULTS OF BASONYL ® GREEN DYE IN VARIOUS OIL-BASED ENAMEL WHITE PAINTS

| Composition | Parts dye/100 parts paint (as measured by weight) | Dissipates | "Pot Life" |
|---|---|---|---|
| satin white alkyd paint basonyl ® green | 0.06757 | 8 hrs | 8 days |
| alkyd flat white paint basonyl ® green | 0.06757 | 5 days | — |
| alkyd flat white paint basonyl ® green | 0.01351 | 8 hrs. | 8 days |
| exterior alkyd paint basonyl ® green | 0.01351 | 6 hrs. | 30 days |
| metal primer basonyl green | 0.01351 | 0.75 hrs. | 3 hrs. |

Other examples of useful paints include acrylics, urethanes, chlorinated rubbers, vinyls, polyamides, raw linseed oil, and oil-modified alkyd resins, such as Duramac® 2452, RCi-11-081.

Other fillers that can be used are: Bentonite 501, Claytone® AF, Nytal 300, Flex 100, Minspar®-4. Other additives commonly used are xylol, toluol, VM&P naphtha, anti-terra-U™, Busan-11M (barium metaborate in powder form), in formulating interior, exterior, flat, semi-gloss, paints and primers for wood, gypsum board, metal or masonry surfaces.

The paint, or other composition, to which the dye of this invention is added, is not required to be opaque. The paint additive of this invention can also be utilized with clear or satin formulated varnish or primer sealer. Because the same characteristic problem is encountered when priming, sealing or varnishing an unfinished or clear finished surface, such as wood, namely, the user being unable to easily observe what has been varnished from what has not, it is felt that the composition of this invention would be a useful additive to clear compositions. To this purpose, the additive has been tried with typical clear wood finish products.

Sealers are used to seal in the grain in a wood product prior to application of a varnish or like composition. Under actual use conditions, a color additive like the present one would not be needed upon the application of a sealer to bare wood. The color additive would, however, be useful between applications of such a sealer to allow the user to easily observe what had been re-sealed. Following is the composition of a representative sealer.

EXAMPLE F. SEALER/VINYL OIL-BASED WOOD PREPARATION

| Composition | Parts/100 (as measured by weight) | Range |
|---|---|---|
| copolymer alkyd resin (Keltrol ™ 1074) | 55.22 | 45.00–65.60 |
| mineral spirits | 20.93 | 13.00–27.00 |
| anti-float liquid | 0.49 | 0.30–0.60 |
| anti-skinning agent | 0.06 | 0.04–0.08 |
| cobalt drier 12% | 0.07 | 0.05–0.09 |
| manganese drier 6% | 0.24 | 0.20–0.28 |
| zinc stearate DLG (zinc salt of stearic acid) | 3.33 | 2.10–4.40 |
| VM&P Naphtha | 19.66 | 15.00–23.00 |
| | 100.00 | |

TABLE V

RESULTS OF REPRESENTATIVE SEALER WITH REPRESENTATIVE DYE

| Composition | Parts dye/100 parts paint (as measured by weight) | Dissipates | "Pot Life" |
|---|---|---|---|
| clear vinyl wood sealer basonyl ® green | 0.04504 | 18 hrs. | 6 days |

Other useful paints include vinyl-acrylics, epoxy, polyamide, styrene, chlorinated rubber or combinations thereof, a representative example of which is described below.

EXAMPLE G. VARNISH/SATIN OIL-BASED, CLEAR

| Components | Parts/100 (as measured by weight) | Range |
|---|---|---|
| Poly-4358 (oil-modified polyurethane) | 70.89 | 60.00–80.00 |
| mineral spirits | 21.85 | 17.0–25.0 |
| Bentonite 501/Claytone AF | 0.67 | 0.00–1.36 |
| anti-skinning agent | 0.24 | 0.12–0.03 |
| cobalt drier 12% | 0.07 | 0.05–0.09 |
| zirconium drier 18% | 0.82 | 0.64–1.23 |
| Cab-o-sil ™ MS (silicon dioxide) | 2.00 | 0.00–3.00 |
| Aerosil ™ O.K. 412 (silica gel) | 3.34 | 0.00–5.00 |
| manganese drier 6% | 0.12 | 0.09–0.15 |
| | 100.00 | |

TABLE VI

RESULTS OF REPRESENTATIVE VARNISH WITH REPRESENTATIVE DYE

| composition | parts dye/100 parts paint (as measured by weight) | dissipates | "pot life" |
|---|---|---|---|
| clear polyurethane basonyl ® green | 0.0901 | 7 days | >45 days |

Other types of compositions to which a light-unstable dye can be successfully added include the following resins: both modified and unmodified phenolics, acrylics, polystyrene, alkyds, terpene resins, Amberol™ 801 Extra Light, and Paraplex™ 5-B and G-50. Drying oil compositions to which a light-unstable dye can be successfully added include tung oil, linseed oil, dehydrated castor oil, and tall oil. Solvents to which a light-unstable dye can be successfully added include toluene, xylene, and VM&P naphtha.

The following describes the composition of an alternative dye or colorant.

EXAMPLE H. DYE COLORANT PLUS ALTERNATE CARRIER

| | Composition | Parts/100 Paint (as measured by weight) | Range |
|---|---|---|---|
| 6.0 | parts Basonyl ® NB-Green 832 | 0.0065 | 0.004–0.012 |
| 94.0 | parts propylene glycol | 0.1022 | 0.0627–0.188 |
| 100.0 | | 0.1087 | |

It is important to note that to get the appropriate amount of dye for use in a particular paint composition, it is critical to use the dye in the right amounts. For example, FD&C red #3 would require less than 0.001 parts in 100 parts of the water-based latex paint used in Example A. In this particular example, the red dye dissipates within 48 hours after use in coating a surface, while having a pot-life of at least three months or more in the dye-paint composition. In actual use conditions, this particular red dye has a "pot-life" of more than three months. No end point has been determined when the dye-paint mix has been maintained under opaque conditions.

EXAMPLE I. EPOXY PAINT

A representative two-part epoxy resin was used, both manufactured by C&M Coating, a Division of Valspar Corporation, Minneapolis, Minn.

1. Epoxy enamel #003149A white interior/exterior
   - Titanium Dioxide
   - Polyamide Base Resin
   - Isopropyl Alcohol
   - Propylene Glycol Mono-Methyl-Ether
   - Ethyl Glycol Mono-Propyl Ether
   - Silica
   - Xylene
   - Ethyl Benzene
   - Toluene
2. Epoxy Activator #0031508
   - Epoxy Resin
   - Ethylene Glycol Mono Propyl Ether
   - Isobutyl Alcohol
   - Propylene Glycol Mono Methyl Ether
   - Toluene
   - Methyl Isobutyl Ketone
   - Diacetone Alcohol
   - Urea Polymer with Formaldehyde
   - Formaldehyde In actual use conditions, the particular dye used with the epoxy paint was a FD&C #2 indigo using propylene glycol as a carrier, although other carriers, such as distilled water, could be used.

Here the dye is dissolved in propylene glycol prior to adding to the epoxy paint described immediately above. Other types of compositions a light-unstable dye can be added to are Epotuf™ 37-151, No. 840 Silicone Resin, Solvesso®-150 Epotuf™ 37-614. A hardener can be used.

All of the forgoing examples are illustrations of the materials useful in the present invention. Other variations are possible without departing from the scope of this invention.

What is claimed is:

1. A paint composition, consisting essentially of:

a) a paint having a first color; and, b) mixed into said composition a light-unstable dye having a second color, whereby the initial color of said composition is a blend of said first and second colors, exposure of the paint to the dissipation-promoting condition of visible light, causing the color of the dye to dissipate and become invisible.

2. The composition of claim 1, wherein the paint is an oil-based paint.

3. The composition of claim 1, wherein the paint is a water-based paint.

4. The composition of claim 1, wherein the paint is an acrylic paint, both water-based and oil-based.

5. The composition of claim 1, wherein the paint is a urethane paint.

6. The composition of claim 1, wherein the paint is a chlorinated rubber, both water-based and oil-based.

7. The composition of claim 1, wherein the paint is a vinyl paint.

8. The composition of claim 1, wherein the paint is a polyamide paint.

9. The composition of claim 1, wherein the paint is varnish.

10. The composition of claim 1, wherein the paint is oil modified alkyd resin.

11. The composition of claim 1, wherein the paint is raw linseed oil.

12. The composition of claim 1, wherein the light-unstable dye is selected from a group consisting of basonyl green, basonyl blue, diarylmethane, FD&C #2 indigotene, FD&C #2 lake, triarylmethane (pylam blue), FD&C #1 triphenylmethane, FD&C #1 lake, FD&C #5 yellow, pyrazoine; FD&C #3 green, triphenylmethane; FD&C #3 red, erythrosine powder, and FD&C #5 yellow lake.

13. A method of making a decorative or protective paint having a first color but initially displaying a color that is a blend of said first color and a second color imparted by a light-unstable dye, said second color dissipating over a relatively short period of time when exposed to visible light, to reveal said first color, comprising the steps of obtaining a composition having said first color and mixing uniformly thereinto an amount of a light-unstable dye having a second color sufficient to obtain the blended color.

14. A method of applying a decorative or protective coating having a first color over a substrate also having said first color while still being able to easily determine where said coating has been applied, comprising applying the paint of claim 1 to the substrate, for use as a color guide, and causing the second color of the light-unstable dye to dissipate.

* * * * *